United States Patent
Yamamoto

(10) Patent No.: US 6,766,065 B1
(45) Date of Patent: Jul. 20, 2004

(54) METHOD OF SETTING AN IMAGE PROCESSING CONDITION OF A FRAME AREA ON A PHOTOGRAPHIC FILM

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/456,327

(22) Filed: Dec. 8, 1999

(30) Foreign Application Priority Data

Dec. 8, 1998 (JP) .......................................... 10-348449

(51) Int. Cl.⁷ ............................ G06K 9/20; H04N 1/04
(52) U.S. Cl. ...................... 382/282; 382/173; 358/453; 358/487; 358/506; 345/620; 345/625; 345/628
(58) Field of Search .............................. 382/282, 173; 345/620, 625, 626, 628; 358/453, 487, 506

(56) References Cited

U.S. PATENT DOCUMENTS

| | | | | |
|---|---|---|---|---|
| 4,659,213 A | * | 4/1987 | Matsumoto | 355/38 |
| 4,673,815 A | * | 6/1987 | Fruth et al. | 250/548 |
| 4,774,569 A | * | 9/1988 | Morton et al. | 348/107 |
| 5,414,779 A | * | 5/1995 | Mitch | 382/199 |
| 5,430,832 A | * | 7/1995 | Imaizumi et al. | 345/620 |
| 5,539,523 A | * | 7/1996 | Nakai et al. | 358/296 |
| 5,557,688 A | * | 9/1996 | Nakamura | 382/164 |
| 5,675,400 A | * | 10/1997 | Stephenson, III | 355/40 |
| 5,880,858 A | * | 3/1999 | Jin | 358/487 |
| 5,913,077 A | * | 6/1999 | Sato et al. | 396/30 |
| 5,926,289 A | * | 7/1999 | Brandestini et al. | 358/487 |
| 6,009,197 A | * | 12/1999 | Riley | 382/199 |
| 6,226,070 B1 | * | 5/2001 | Yamamoto | 355/40 |
| 6,339,483 B1 | * | 1/2002 | Hoshino et al. | 358/487 |

\* cited by examiner

*Primary Examiner*—Jingge Wu
*Assistant Examiner*—Ryan J. Hesseltine
(74) *Attorney, Agent, or Firm*—Birch, Stewart, Kolasch & Birch, LLP

(57) ABSTRACT

The image processing method sets an image processing condition of an image using either image data of an image clipping area corresponding to the image or extended image data which is image data of an extended image area that is wider than the image clipping area in a direction in which a plurality of images is continuously recorded; represents an image obtained by processing the extended image data in accordance with the image processing condition and the image clipping area or only an image within the image clipping area obtained by processing said extended image data in accordance with said image processing condition; judges whether the represented image clipping area is appropriate or not; and modifies the image clipping area in accordance with a result of the judging. Even when a frame clipping error occurs in a photoprinter, the method can consistently output an appropriate image preventing decrease of work or production efficiency or keeping it to a minimum.

13 Claims, 4 Drawing Sheets

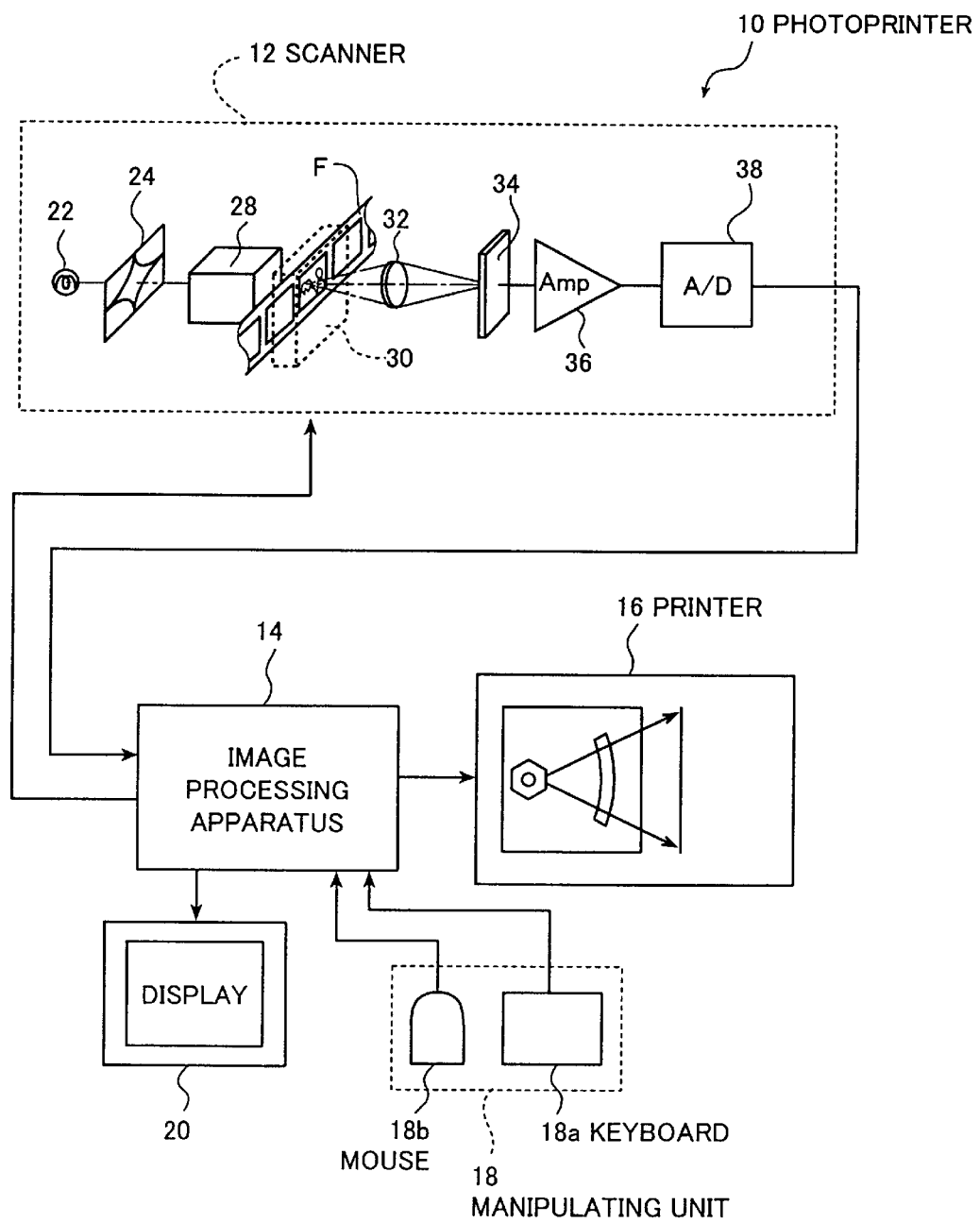

US 6,766,065 B1

METHOD OF SETTING AN IMAGE PROCESSING CONDITION OF A FRAME AREA ON A PHOTOGRAPHIC FILM

BACKGROUND INFORMATION

The present invention relates to the technical field of an image processing method. More particularly, the present invention mainly relates to an image processing method that is capable of performing favorable image verification and image processing with least decrease of work efficiency even when each fram (image) clipping is not appropriate, namely, a frame clipping error (a clipping error of a frame area or frame position) occurs, in the image processing for setting an image processing condition by reading an image on a film photoelectrically.

Heretofore, the images recorded on photographic films such as negatives and reversals (which are hereunder referred to simply as "films") have been commonly printed on light-sensitive materials (photographic paper) by means of direct (analog) exposure in which the light-sensitive materials are exposed by projection light through the films.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record an image (latent image), which is subsequently developed to produce a print (photograph). The printer operating on this principle has been commercialized as a digital photoprinter.

The digital photoprinter basically comprises a scanner (image reading apparatus) for reading an image recorded on the film photoelectrically by projecting a reading light to a film and reading its projection light, an image processing apparatus for carrying out a predetermined image processing on an input image data read by the scanner so as to obtain an output image data for image recording, that is, exposure condition, a printer (image recording apparatus) for recording the image as a latent image by exposing a light-sensitive material by, for example, scanning with light beam corresponding to the output image data outputted from the image processing apparatus, and a processor (developing apparatus) for carrying out development processing on the light-sensitive material exposed by the printer so as to produce a finished print in which the image is reproduced.

In the digital photoprinter having such features, images are handled as digital image data so that image processing can be performed by image data processing. Therefore, correction of washed-out highlights or dull shadows caused by photographing with backlight, an electronic flash or the like, sharpness processing, correction of color failures, density failures or the like, correction of under-exposure or over-exposure, and correction of insufficient marginal lumination or the like are favorably performed to produce a high quality print which has never been realized by a conventional direct exposure.

The photoprinter reads the image record on the film photoelectrically utilizing a CCD sensor or the like for the purpose of stably outputting an appropriately-finished print to obtain input image data and, thereafter, based on the thus obtained input image data, determines an image processing condition (insertion quantity of a color filter or the like in the case of direct exposure) on a frame (image) basis.

Reading of the image, for example, in an apparatus employing an area sensor, is performed by illuminating a whole area of individual frames one after another with a reading light while the film is intermittently transported so as to hold individual frames in registry with a predetermined reading position one after another. In an apparatus employing a line sensor, the whole area of the film read by slit scanning with the reading light while the film is continuously transported and, then, the image of each frame is read by detecting each frame from the obtained image data.

However, an opportunity may occur in which an image area of each frame (clipping area of each image) is not appropriate, namely, the frame clipping error (detection failure of the frame) is brought about depending on transport accuracy of the film, a condition of the image (particularly, under-exposure image) or the like. Moreover, this frame clipping error can be confirmed only by representing the image on a display.

When the frame clipping error occurred, image processing condition must be set again in such a way that, in the apparatus employing the area sensor, the image is read again while, in the apparatus employing the line sensor, the image area is detected again, thereby setting the image processing condition anew. For this reason, when the frame clipping error occurs, work efficiency or production efficiency of the finished prints is decreased and complexity of work sequence is brought about.

Particularly, in the apparatus employing the line sensor, in order to perform image processing more favorably, a system is known to set the respective image processing condition of each frame by using image data of all frames recorded on a film. However, in this system, if the clipping error of one frame occurs, the image processing conditions of all frames must be set again, thereby bringing about decrease of work efficiency to a great extent.

SUMMARY OF THE INVENTION

An object, therefore, of the present invention is to solve the problems in the above-described prior art and to provide an image processing method capable of preventing the decrease of work or production efficiency or keeping it to a minimum, even if a frame clipping error occurs and outputting an appropriate image stably and consistently in a photoprinter.

In order to achieve the above-described object, the present invention provides an image processing method of setting an image processing condition of an image using image data of the image obtained by photoelectrically reading an original recorded continuously with a plurality of images, comprising the steps of:

setting the image processing condition of the image using either image data of an image clipping area corresponding to the image or extended image data which is image data of an extended image area that is wider than the image clipping area in a direction in which the images are continuously recorded;

representing an image obtained by processing the extended image data in accordance with the image processing condition and the image clipping area or only an image within the image clipping area obtained by processing the extended image data in accordance with the image processing condition;

judging whether the represented image clipping area is appropriate or not; and modifying the image clipping area in accordance with a result of the judging.

Here, preferably, in addition to the image processing condition set as a first image processing condition using the extended image data, a second image processing condition is set using the image data of the image clipping area and wherein the extended image data is processed using the first image processing condition and the second image processing condition.

Moreover, preferably, the first image processing condition corresponds to processing of a local area of the image, and wherein the second image processing condition corresponds to processing of a whole area of the image.

It is preferable that processing of the local area of the image is processing using an area mask, and wherein processing of the whole area of the image is processing of at least one of density and color balance.

Preferably, a ratio of the extended image data to the image clipping area is allowed to be changeable from one image to one image such that when a clipping accuracy of the image clipping area becomes lower, the ratio becomes larger.

BRIEF DESCRIPTION OF THE DRAWINGS

FIG. 1 is a block diagram showing an embodiment of a digital photoprinter utilizing an image processing method of the present invention;

DETAILED DESCRIPTION OF THE INVENTION

Figure 2A:
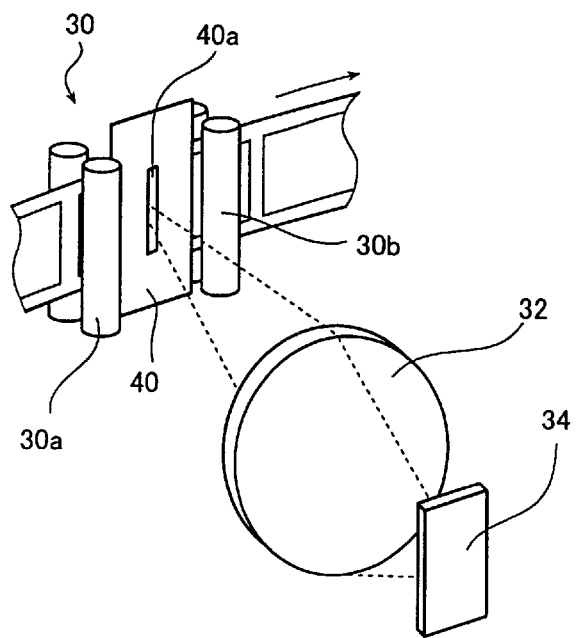
FIG. 2A is a perspective view conceptually showing an embodiment of a carrier of the digital photoprinter shown in FIG. 1.

Hereinafter, an image processing method of the present invention will now be described in detail with reference to the preferred embodiments shown in the accompanying drawings.

FIG. 1 is a block diagram showing an embodiment of a digital photoprinter utilizing an image processing method of the present invention.

The digital photoprinter (hereinafter referred to as photoprinter) 10 shown in FIG. 1 basically comprises a scanner (image reading apparatus) 12 for reading an image recorded on a film F photoelectrically, an image processing apparatus 14 for carrying out image processing on the read image data (image information) and manipulating and controlling the photoprinter 10 as a whole, and a printer 16 for exposing imagewise a light-sensitive material (photographic paper) with light beams modulated in accordance with the image data outputted from the image processing apparatus 14 and carrying out development processing to output a finished print (photograph).

A manipulating unit 18 having a key board 18a and a mouse 18b for inputting or setting various conditions, a selection and instruction of a processing, an instruction of specific color/density correction and the like and a display 20 for displaying an image read by the scanner 12, various operating instructions, pictures (screens) for setting or registering various conditions and the like are connected to the image processing apparatus 14.

The scanner 12 reads the image recorded on the film F or the like frame by frame photoelectrically, and comprises a light source 22, a variable diaphragm 24, a diffusion box 28 for diffusing a reading beam incident on the film F so that it becomes uniform across the plane of the film F, a focusing lens unit 32, an image sensor 34 having line CCD sensors corresponding to respective image reading for R (red), G (green) and B (blue), an amplifier (Amp) 36 and an A/D (analog/digital) converter 38.

In the photoprinter 10, dedicated carriers mountable to the main body of the scanner 12 is prepared depending on the kind of the film such as a negative film (or reversal film) of Advanced Photo System (APS) and 135 size, and film type such as stripes (sleeves), slide and the like. By replacing the carrier, this can meet various films and processings. The image (frame) recorded on the film and supplied for print production is transported to a predetermined reading position by this carrier.

When the scanner 12 reads an image recorded on the film F, a reading light emitted from the light source 22 and adjusted in terms of light amount by the variable diaphragm 24 is incident on the film F located at a predetermined reading position by the carrier 30 and passes therethrough to obtain a projection light carrying the image recorded on the film F.

As shown schematically in FIG. 2A, the illustrated carrier 30 has a pair of transport roller pairs 30a and 30b and a mask 40 having a slit 40a. The transport roller pairs 30a and 30b are provided on opposite sides of the predetermined reading position in an auxiliary scanning direction which is perpendicular to the direction in which the line CCD sensors in the image sensor 34 extend (i.e., the main scanning direction) and they transport the film F with its length being parallel to the auxiliary scanning direction as it is in registry with the reading position. The slit 40a defines the projected light from the film F to have a predetermined narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the film F is read.

Moreover, the carrier 30 is provided with a code reader and the like for reading DX code, extended DX code, FNS code and so forth formed on the film F. Furthermore, the carrier 30 corresponding to the film F (cartridge) of the Advanced Photo System is provided with a magnetic head for reading information recorded on a magnetic recording medium of the film F and recording necessary information thereon.

As described above, the reading light passes through the film F held in registry with the predetermined reading position by the carrier 30 so that it becomes a projection light bearing an image. This projection light is focused on a light receiving surface of the image sensor 34 by the focusing lens unit 32.

Figure 2B:
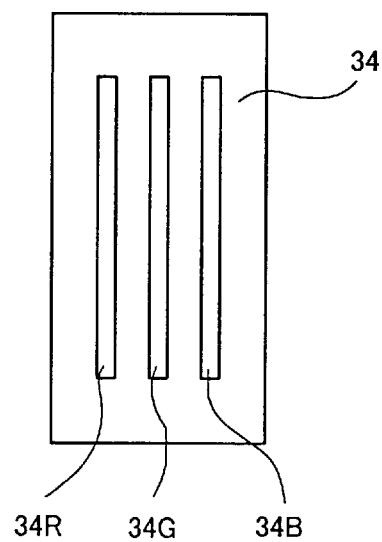
FIG. 2B is a perspective view conceptually showing an embodiment of an image sensor of the digital photoprinter shown in FIG. 1.

As shown in FIG. 2B, the image sensor 34 is a so-called 3-line color CCD sensor having a line CCD sensor 34R for reading red image, a line CCD sensor 34G for reading green image, and a line CCD sensor 34B for reading blue image. Those line CCD sensors are extended in the main scanning direction as described above. The projection light of the film F is separated to three primary colors, red, green and blue by this image sensor 34 and read photoelectrically.

An output signal of the image sensor 34 is amplified by an amplifier 36, converted to digital signal by an A/D converter 38 and sent to the image processing apparatus 14.

In the scanner 12, the images recorded on the film F are captured by two scans, the first being prescan of reading at a low resolution and the second being fine scan of reading at a high resolution for obtaining output image data of an output image.

The prescan is performed at a preliminarily set prescan reading condition which ensures that the images on all films which the scanner 12 is about to read can be read without saturating the image sensor 34. On the other hand, the fine scan is performed at a fine scan reading condition for each frame, which is set by the prescanned data so that the image sensor 34 is saturated by a density slightly lower than the minimum density of the image (frame) of interest. Therefore, output signals of the prescan and fine scan are basically the same except for the resolution and the output level.

Here, in an illustrated example of the apparatus which performs reading by slit scanning using the line sensor, prescan is executed by reading whole area including the image area recorded on the film F while the film F is transported continuously from the leading end to the trailing end, each frame (image) is clipped from the obtained whole area image data to obtain the image data (prescanned data) of each frame and, after the image processing condition of each frame is determined, fine scan is performed on each frame while the film F is transported in a reverse direction.

According to a preferred embodiment of the present invention, the scanner is not restricted to a type by such slit scanning, but may be a type, while employing an area CCD sensor and red, green and blue color filters capable of being inserted in the optical path, utilizing an areal exposure for reading an entire area of a single image (one image) by separating the image into R, G, B color s on a frame basis.

In the case of utilizing this areal exposure, a mask defining the reading area of the film has a size corresponding to an extended image area as described later.

The photoprinter 10 can produce a finished print by receiving image data not only from the scanner 12 which photoelectrically reads the image recorded on the film such as a negative, reversal film, or the like, but also from various image data supply sources which include, for example, an image reading apparatus for reading an image on a reflection material, an image pickup device such as a digital camera, digital video camera or the like, a communication device such as a computer communication network or the like, and a recording medium such as an MO disk (magneto-optic recording medium) or the like.

As described above, an output signal (output image data) from the scanner 12 is outputted to the image processing apparatus 14.

Figure 3:
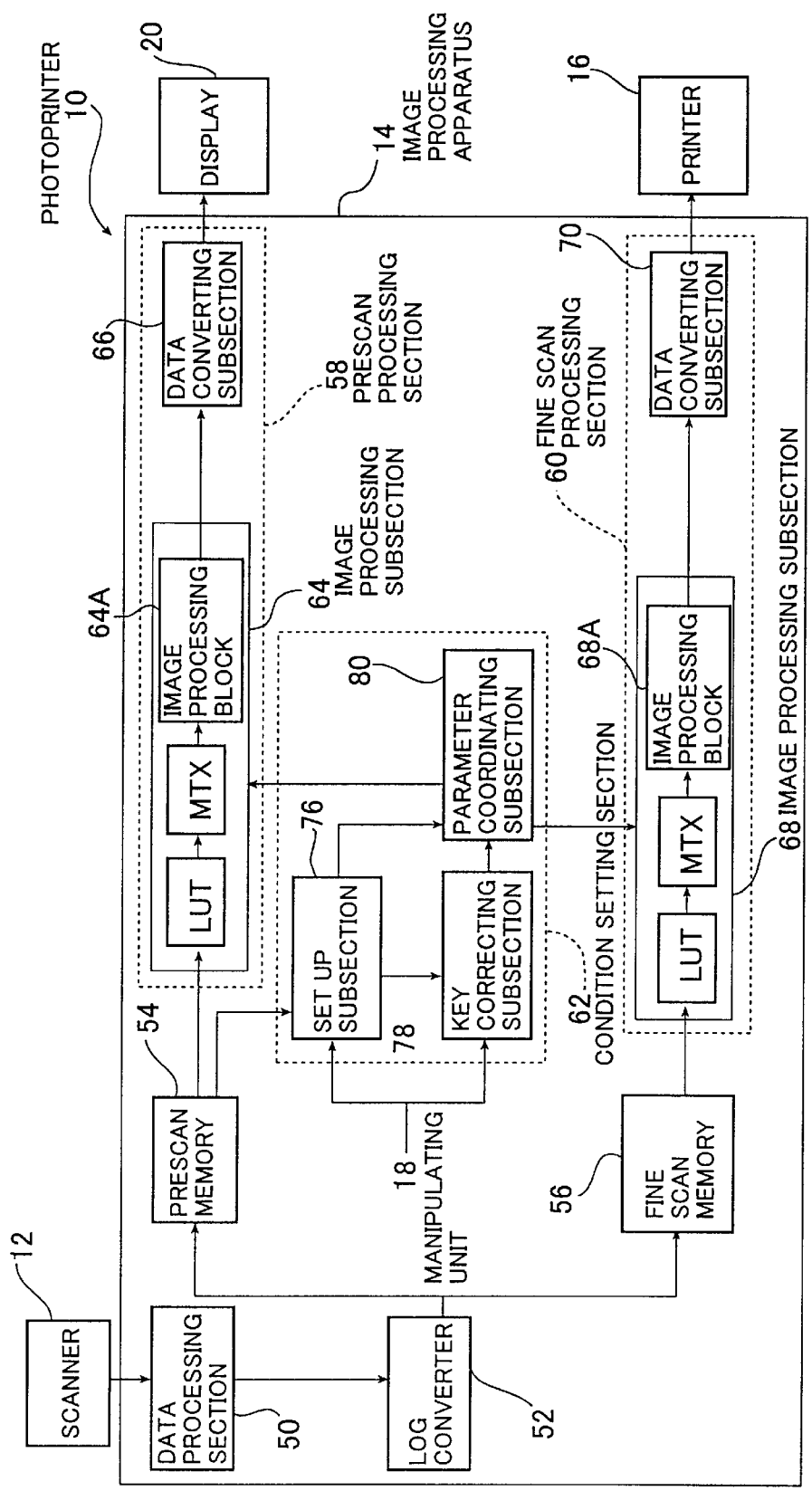
FIG. 3 is a block diagram showing an embodiment of an image processing apparatus of the digital photoprinter shown in FIG. 1.

FIG. 3 shows a block diagram of the image processing apparatus (hereinafter referred to simply as "processing apparatus") 14. The image processing apparatus 14 comprises a data processing section 50, a log converter 52, a prescan (frame) memory 54, a fine scan (frame) memory 56, a prescan processing section 58, a fine scan processing section 60 and a condition setting section 62.

FIG. 3 mainly shows sites relating to the image processing. In addition to the components shown here, the processing apparatus 14 includes a CPU for controlling and managing the overall operation of the photoprinter 10 including the processing apparatus 14, a memory or the like for storing information necessary for operation or the like of the photoprinter 10. A manipulating unit 18 and a display 20 are connected to respective sites via this CPU (CPU bus) and the like.

Respective output signals for red, green and blue outputted from the scanner 12 are subjected to predetermined processing for DC offset correction, darkness correction, shading correction and the like by the data processing section 50 and then converted to digital image data by the log converter 52. Prescanned (image) data is stored in the prescan memory 54 and fine scanned (image) data is stored in the fine scan memory 56.

The prescanned data and the fine scanned data are basically the same data except for resolution (pixel density) and signal level The image data stored in the prescan memory 54 is processed by the prescan processing section 58 and the image data (fine scanned data) stored in the fine scan memory 56 is processed by the fine scan processing section 60.

The prescan processing section 58 comprises an image processing subsection 64 and a data converting subsection 66. On the other hand, the fine scan processing section 60 comprises an image processing subsection 68 and a data converting subsection 70.

The image processing subsection 64 of the prescan processing section 58 and the image processing subsection 68 of the fine scan processing section 60 are sites where images (image data) read by the scanner 12 are subjected to the predetermined image processing in accordance with the respective image processing conditions set by the condition setting section 62 which will be described in detail later.

Both processing subsections 64 and 68 carry out basically the same processing except that the pixel density of image data to be processed is different so that the image processing subsection 68 of the fine scan processing section 60 is explained below as a representative example.

LUT in the image processing subsection 68 (64) is a site where color balance adjustment, contrast adjustment (gradation processing) and lightness adjustment (density adjustment) of the image are performed with an LUT (look-up table).

MTX is a site for performing saturation adjustment of the image by a matrix computation.

Moreover, blocks (image processing blocks) 64A and 68A are sites for performing other image processing such as sharpness processing, dodging processing (compression of image dynamic range while maintaining intermediate gradation), composition of characters or images, and the like than the aforementioned image processing of various kinds.

The image data processed in the image processing subsections 64 and 68 are sent to the data converting subsections 66 and 70, respectively.

The data converting subsection 66 of the prescan processing section 58 converts the image data processed by the image processing subsection 64 by means of a 3D (three-dimensional)-LUT or the like to produce the image data corresponding to the representation on the display 20. In the present invention, after looking at the representation on the display 20, clipping of each frame, namely, confirmation and correction of the image area of each frame to be reproduced as an output image and, moreover, image verification or the like are performed.

On the other hand, the data converting subsection 70 of the fine scan processing section 60 converts the image data processed by the image processing subsection 68 by means of 3D-LUT to produce an image data corresponding to image recording by the printer 16 and, thereafter, the thus converted image data is supplied to the printer 16.

Various processing conditions in both prescan processing section 58 and fine scan processing section 60 are set in the condition setting section 62.

The condition setting section 62 comprises a setup subsection 76, a key correcting subsection 78 and a parameter coordinating subsection 80.

The setup subsection 76 performs clipping of each frame (frame detection) using the whole area image data obtained by the prescan and, thereafter, on each frame thus clipped, setting of a reading condition of the fine scanning, selection of kinds of the image processing to be performed and setting of image processing conditions in the image processing subsections 64 and 68 and data converting subsections 66 and 70 and so forth; and, then, the thus set and selected matters and the like are supplied to the parameter coordinating subsection 80.

In the processing apparatus 14 utilizing the present invention, the setup subsection 76 performs the clipping, the settings the selection and the like including the setting of the image processing condition as described below.

As described above, in the illustrated photoprinter 10, prescanning is performed by reading a whole area of the film F in which images including all of the frame images are recorded while the film F is continuously transported from a leading end to a trailing end.

In the setup subsection 76, firstly, using at least one of whole area image data obtained by the prescan, magnetic information (APS system), DX code and the like recorded on the film, a photographed image area of each frame is detected and clipped, namely, the photographed image area of each frame to be reproduced is detected as a clipping area (hereinafter referred to as "frame area"). Next, the frame area is set and, then, image data within the frame area is set.

In the preferred embodiment of the present invention, for example, detection or clipping (setting) of the frame area 82 of one frame can be performed in the following steps but the embodiments of the present invention are not limited to these steps.

1. First, in a first detection step, at the beginning, an edge of a leading end and an edge of a trailing end of an image of one frame are determined starting from a leading side of the prescanned image (whole area image data) of the photographic film of, for example, one sleeve and advancing along a direction in which images are continuously recorded (in a longitudinal direction of the film) to obtain an image size of one frame, namely, a longitudinal film length occupied by the image of one frame.

2. Next, in a second detection step, if the thus obtained image size is close to a reference frame size, for example, 38 mm in the case of a 135 film, it is set as a frame image and the photographed image area between the corresponding edges of the leading and trailing ends is set as the frame area. If the obtained image size does not match with the reference frame size, it is set aside for later setting. Subsequently, in the same manner as in the first detection step described above, both edges of leading and trailing ends of the image of the next frame and the image size are obtained, where, if the obtained image size is close to the reference frame size, then the frame area is set and, if not, it is set aside for later setting and subsequently, detection of the frame area of the image of the following frame after next is continued.

3. In a third step, when such detection and setting of the frame areas have reached the trailing end of the prescanned image, an edge or edges of each image of frames set aside for later setting is obtained and the frame position (frame area) is determined on the basis of the image positions which have been detected and set. In other words, if an edge or a pair of edges of the image is found to be within a predetermined range from the edge of the image of the frame already detected, the edge or edges is regarded as the image edge or edges of the frame and set as the frame position (frame area).

4. Lastly, in a fourth step, when no image a size of which matches with the reference frame size was found in the above second step, a pair of edges which match the reference frame pitch (38 mm) is to be found and then the frame position (frame area) is registered on the basis of the thus found edges.

Accordingly, by performing detection steps of from the first to the fourth steps, the frame position, namely, the frame area of each image of all frames in one sleeve of film can be detected and set (determined).

Figure 4A:
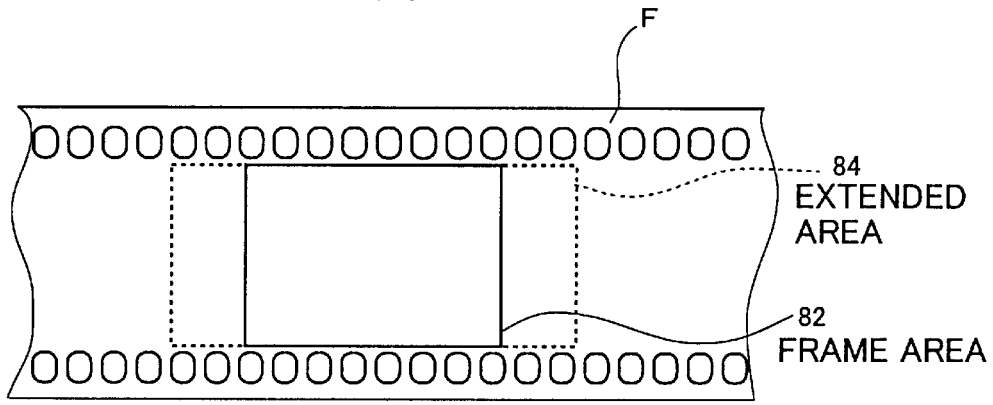
FIG. 4A, FIG. 4B, FIG. 4C, FIG. 4D and FIG. 4E are schematic diagrams each explaining the image processing method of the present invention.
Figure 4B:
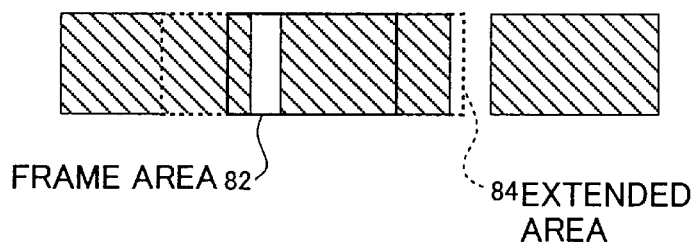

Next, as shown in FIGS. 4A and 4B, the setup subsection 76 sets on a frame basis a photographed image area 84 (hereinafter referred simply as "extended area") which is extended wider in a transport direction of the film F (in a direction in which images continue, namely, a plurality of images are continuously photographed) than the frame area 82 detected and set and, thereafter, sets on the frame basis a reading condition of fine scanning and an image processing condition using an image data of the thus set extended area 84 (hereinafter referred to simply as "extended image data"). Preferably, the image processing condition is set using the extended image data (or image data of the frame area 82) of all frames, in addition to the extended image data of each frame.

Specifically, the setup subsection 76 constructs a density histogram, computes image characteristic quantities, such as average density, high light (lowest density), shadow (highest density) and the like from the extended image data and, moreover, sets a reading condition of fine scanning in accordance with an operator's instructions to be conducted if needed and, furthermore, determines the image processing condition of each frame, such as construction of LUT which performs the above-described color balance adjustment or the like, construction of matrix arithmetic expression which performs the saturation adjustment and the like.

The reading condition of fine scanning may be set using the image data of the frame area 82.

In this case, a size of the extended area 84 is not limited to any particular extent but may appropriately be set so as to have a wider area in the transport direction than the frame area 82 in accordance with the detection accuracy or the like of the frame area 82.

In other words, detection of the frame area 82 is not always performed appropriately. For example, when frames of under exposure (insufficient exposure), such as fire work scenes or the like, continue one after another, as shown in FIG. 4B, a case may occur in which an area that is out of an appropriate frame area marked with slant lines and thereby includes an area outside a photographed image area, or, in an extreme case, the outside area and also a part or all of an adjacent frame is detected as the frame area 82. In the scanner that uses the aforementioned area sensor, a position error between the mask and the photographed image area is brought about by a transport error of the film, which causes the trouble similar to that described above.

Though described in detail later, in the processing apparatus 14 utilizing the present invention, when detection of the frame area 82 is failed (frame clipping error), the frame area 82 can be corrected within the extended area 84 while, when an appropriate photographed image area is included in the extended area 84, the area is set anew as the appropriate frame area. Moreover, when the frame area 82 can not be set anew within the extended area 84, detection of the frame area 82 or scanning is performed again.

It is needless to say that performing the detection or scanning again will invite the decrease of work efficiency. Accordingly, if the detection accuracy of the frame area 82 is low, it is preferable to set the extended area 84 wider.

However, in the preferred embodiment of the present invention, the image processing condition is set using the extended image data so that the larger the extended area 84 the longer the computing time. Moreover, since data of the area which is out of the frame area 82 is also taken as the image data of each frame, a noise enters the image data, and the accuracy of the image processing is decreased.

Therefore the extended area 84 may appropriately be set in accordance with the detection accuracy of the frame area 82, image processing efficiency (production efficiency), image processing accuracy (image quality) or the like. Though it may appropriately be set, preferably, it is less than twice, more preferably, less than 1.6 times the frame area 82 in terms of the length in the transport direction.

Moreover, it is preferable that the extension ratio of the extended area 84 to the frame area 82 which is the clipping area, namely, the extension ratio of the extended image data, is allowed to be changeable on a basis of an image in one frame in accordance with the image clipping accuracy, that is, the detection accuracy of the frame area 82. Particularly, it is preferable that the extension ratio of the extension area 84 (extended image data) is allowed to be changeable on a basis of an image in one frame such that the lower the detection accuracy (image clipping accuracy) of the frame area 82, the larger the ratio becomes.

For example, detection of the frame area 82 or the image clipping is performed in the above-described order of detection steps from the first to the fourth steps, the extension ratio can be changed as described below but the preferred embodiment of the present invention is not limited to those steps or methods.

First of all, when the frame area (image frame size) is determined in the above-described second detection step, the extended image data area may be set as, for example, 1.2 times the frame area.

Next, when the frame area is determined in the above-described third detection step, the extended image data area may be set as, for example, 1.4 times the frame area.

Moreover, when the frame area is determined in the above-described fourth detection step, the extended image data area may be set as, for example, 1.6 times the frame area.

In this way, the extension ratio of the extended area 84 to the detection accuracy of the frame area 82 (image clipping accuracy) can be determined.

Moreover, the extended image area 84 may be set in a fixed form on each type of a device, or may be set in a fixed form on an apparatus basis in accordance with individual difference of an apparatus or the like at the time of skipping or the like. Particularly, it is preferable that the extended image area 84 can appropriately be adjusted or set in accordance with change of detection accuracy with the passage of time or change of required image quality or work efficiency or the like of the frame area 82.

In the processing apparatus 14 of the preferred embodiment of the present invention, which performs digital image processing, different image processing conditions (particularly, at least one of color adjustment and density adjustment) between the whole image and specified or predetermined local area such as a person's face, sky or the like may be set. By doing so, a higher quality image with principal subject of the person or the like and a characteristic background being favorably finished can be outputted.

Moreover, processing of the whole image is preferably of processing of at least one of density and color balance while processing of local area of the image is preferably of processing using an areal mask.

In this case, if the image processing conditions of the whole image and a local area are different from each other, it is preferable that the image processing condition of the whole image is set using the image data of the frame area 82 while the image processing condition of the local area is set using the extended image data of the extended area 84.

If the frame area 82 having an ordinary accuracy is detected, the frame clipping error does not occur so often and, moreover, it is further rare that a large frame clipping error occurs. Therefore, it is preferable that the image processing condition is basically set using the image data of the frame area 82 which does not include noise.

If the image processing adjusts only density or color balance of the whole image, even when the frame clipping error occurs, no substantial image deterioration occurs in most cases even by performing image processing using an image processing condition computed from the detected frame area 82.

However, when a different image processing condition in a local area such as a person or the like from that of the whole image is set, the frame clipping error occurs. Moreover, when a local area exists outside the frame area 82, the image processing condition of the local area can not appropriately be set unless the image data of the local area outside of the frame area 82 is also used whereupon a reproduced image quality, particularly, image quality of the principal subject or the characteristic area deteriorates, as a result, setting of the image processing condition anew becomes necessary.

Therefore, by having the above-described structure, when the image processing condition is changed locally, even if the frame clipping error occurs, it is not necessary to set the image processing condition anew whereupon a high quality image can be outputted.

The key correcting subsection 78 computes a correction amount for each of lightness correction, color correction, gradation correction, saturation correction or the like in accordance with an operator's instruction for image corrections inputted by means of the key board 18a or the like and supplies each correction amount to the parameter coordinating subsection 80.

The parameter coordinating subsection 80 receives image processing conditions or the like set by the setup subsection 76, sets the thus received image processing conditions at predetermined sites in each of the prescan processing section 58 and fine scan processing section 60, further creates an image processing condition such as LUT or the like for executing the correction in accordance with the correction amount calculated by the key correcting subsection 78, sets the thus created image processing condition at a predetermined site and also corrects the image processing condition set in each site.

Hereafter, the image processing method of the present invention will be described in detail by describing an operation of the processing apparatus 14.

An operator mounts a carrier 30 corresponding to the film F on the scanner 12, sets the film F (cartridge) with a predetermined length, for example, a length of one roll or one sleeve at a predetermined position of the carrier 30, inputs necessary instructions such as print size to be produced and the like and instructs start of print production.

After the print production start has been instructed, the F-number of the variable diaphragm 24 of the scanner 12 and the storage time of the image sensor (line CCD sensor) 34 are set corresponding to the reading condition of the prescan; the carrier 30 transports the film F in the auxiliary scanning direction at a speed suitable for prescan so as to start the prescan; as described above, the film F is slit scanned as it is held in registry with a predetermined reading position so that a projection light is focused on the image sensor 34; and an image photographed on the film F is separated to red, green and blue images and read photoelectrically.

In this embodiment, in the prescan, the whole area in which images are recorded of the film F is read by transporting the film F of, for example, one roll or one sleeve continuously from the leading end to the trailing end and, thereafter, the fine scan is performed by transporting the film F in a reverse direction. However, the preferred embodiment of the present invention is not limited to this manner but the prescan or fine scan may be performed frame by frame or every predetermined number of frames.

Output signals of the image sensor 34 obtained by the prescan are amplified by the amplifier 36, sent to the A/D, converter 38, converted to digital signals thereby and the thus converted digital signals are transmitted to the processing apparatus 14. Thereafter, the signals are subjected to data processing at the data processing section 50, converted into digital image data by the log converter 52 and then stored in the prescan memory 54.

If the prescanned image data is stored in the prescan memory 54, this data is read by the setup subsection 76 in the condition setting section 62; as shown in FIGS. 4A and 4B, the frame area 82 of each frame is detected one after another in the manner and order described above; and, further, the extended area 84 of each frame is set.

When the prescan of the film F with a predetermined length is finished, the setup subsection 76 further constructs density histograms and computes image characteristic quantities such as highlights or shadows using the extended image data of the extended area 84 of each frame (or using the image data of all frames additionally) and sets the reading condition of the fine scan on a frame basis to send the thus set reading condition to the scanner 12. It, further, sets various image processing conditions of gradation adjustment or the like to supply the thus set image processing conditions, together with information of the frame area 82 and the extended area 84, to the parameter coordinating subsection 80.

The parameter coordinating subsection 80 sets the thus supplied image processing conditions at predetermined sites (hardware) of each of the prescan processing section 58 and fine scan processing section 60 and supplies information of the frame area 82 and the extended area 84 to the image processing subsection 64 of the prescan processing section 58.

When an image processing condition of each of a .predetermined number of frames is set, the image data is read from the prescan memory 54 by the prescan processing section 58. Then, the extended image data of each frame is extracted by the image processing subsection 64, image processed under the image processing condition set on a frame basis and converted by the data converting subsection 66 to be represented on the display 20 as an extended image for verification (simulation image).

Figure 4C:
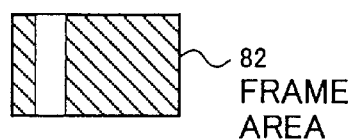
Figure 4D:
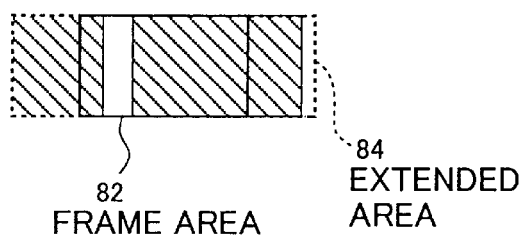

As the extended image for verification, for example, as shown in FIG. 4C, only the area of the frame area 82 may be represented, or, as shown in FIG. 4D, not only the whole area of the extended area 84 may be represented, but also the frame area 82 in continuous lines or dotted lines may be represented. The frame areas in examples in both figures correspond to that in the example in FIG. 4B.

Representation of the extended image for verification may be conducted frame by frame, in a predetermined number of frames such as 6 frames at a time or the like or in all images in one roll of the film F such as 24 frames or the like.

Figure 4E:
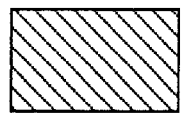

The operator confirms on a frame basis whether the frame area 82 is appropriate or not, namely, whether a frame clipping error (frame detection failure) exists or not after looking at the image represented on the display 20. When it is found that the frame clipping error occurs, the frame area is adjusted by dislocating it by means of the keyboard 18a or mouse 18b and, as shown in FIG. 4E, an appropriate frame area is set in accordance with the image area of the corresponding frame.

Information of the appropriated frame area of each frame is sent to the image processing subsection 68 of the fine scan processing section 60.

In a case in which the appropriate frame area can not be set in the extended area 84, detection or prescan of the frame area of the frame of interest is performed again; or when the image processing condition is set using image data of all frames, detection or prescan of frame areas of all frames is performed again, if needed.

The operator confirms (verifies) the image, that is, a result of the processing, if necessary, and adjusts color, density, gradation or the like with an adjustment key or the like set on the key board 18a, if such correction of the image is needed.

The input of this adjustment is sent to the key correcting subsection 78 and then the key correcting subsection 78 calculates a correction amount in accordance with the correction input and sends the thus calculated correction amount to the parameter coordinating subsection 80. The parameter coordinating subsection 80 sets a correction condition for executing this correction in accordance with this correction amount and corrects the image processing condition previously set. Therefore, an image represented on the display 20 changes corresponding to this correction, namely, the adjustment input by the operator.

Confirmation of the frame clipping error or adjustment of the frame area, and verification may be performed consecutively frame by frame, but may be performed on each of a predetermined number of frames, after conducting confirmation or the like of the frame clipping error of each of the predetermined number of frames.

When the operator finishes confirmation of the frame clipping error or confirmation and adjustment thereof, and verification, the operator inputs instructions for outputting a print of a corresponding frame using the key board 18a or the like. Consequently, the frame area and the image processing condition is established so that the fine scan is started.

Except that the film F is transported in a reverse direction of that of prescan at a speed corresponding to the fine scan and the stop-down value of the variable diaphragm 24 and storage time or the like of the image sensor 34 are set in accordance with the reading condition of the corresponding frame, the fine scan is carried out in the same manner as the prescan such that the projection light of the film F is focused in the image sensor 34, the image data is outputted from the scanner 12, the image data processed in the data processing section 50 and the log converter 52 is stored in the fine scan memory 56.

The image data of a predetermined quantity being stored in the fine scan memory 56 is read by the fine scan processing section 60; the image data in the frame area finalized on a frame basis is detected, processed under the image processing condition of each frame finalized by means of LUT, MTX, a block 68A or the like, sent to the data converting subsection 70, converted to the image data corresponding to image recording by the printer 16 in the image data converting subsection 70 and sent to the printer 16 as output image data.

As is apparent from the above description, according to the present invention, the extended area is set and the image processing condition is set by the thus set extended area so that, even if the frame clipping error occurs, detection of the frame area (scanning again when an area CCD is used), setting the image processing condition and performing the image processing of the verified image again are not necessary, if only the frame clipping error lies within a predetermined range. This practically prevents the decrease of work efficiency or keeps it to a minimum. Particularly, when the image processing conditions of all frames are set using image data of all frames, if even one frame clipping error occurs, it has conventionally been necessary for the frame areas of all frames to be detected or read again. Therefore, the effectiveness of the present invention is extremely large.

Moreover, in the conventional apparatus, in a case in which a person at an edge of a photograph shooting a group of people is not included within a frame when the frame is normally clipped, it is necessary to detect the frame area again or to set the image processing condition again. However, according to the present invention, these actions are not necessary to perform.

The printer 16 exposes the light-sensitive material (photographic paper) in accordance with the image data to record a latent image and performs image processing corresponding to the light-sensitive material to output a (finished) print. To give one example of the printer's operation, the light-sensitive material is cut to a predetermined length in accordance with the size of the final print; thereafter, the printer records a back print and three light beams for exposure to red (R), green (G) and blue (B) in accordance with the spectral sensitivity characteristics of the light-sensitive material are modulated in accordance with the image data (recorded image); the three modulated light beams are deflected in the main scanning direction while, at the same time, the light-sensitive material is transported in the auxiliary scanning direction perpendicular to the main scanning direction so as to record a latent image; the latent image bearing light-sensitive material is then subjected to wet development processing comprising color development, bleach-fixing, rinsing and the like; the thus processed light-sensitive material is dried to produce a finished print; a plurality of prints thus produced are sorted and stacked.

While the image processing method of the present invention has been described in detail above, it should be noted that the present invention is by no means limited to the embodiments described above and that various improvements and modifications can be made without departing from the scope and spirit of the invention.

For example, in the above-described embodiments, detection, setting or the like of the image processing conditions or the frame area has been performed by the prescan. However, the present invention is not limited to the above embodiments but detection, setting or the like may be performed by the fine scan only and then by thinning the obtained image data. Moreover, the present invention is capable of being used not only in the digital photoprinter, but also in the conventional analog photoprinter utilizing the direct exposure.

As described above in detail, according to the present invention, even if the frame clipping error occurs in the photoprinter or the like, an appropriate image can be outputted in a stable and consistent manner practically preventing the decrease of work efficiency, production efficiency or the like or keeping it to a minimum.

What is claimed is:

1. An image processing method of setting an image processing condition of an image using image data of the image obtained by photoelectrically reading an original recorded continuously with a plurality of images, comprising the steps of:

setting the image processing condition of the image using either image data of an image clipping area corresponding to the image or extended image data which is image data of an extended image area that is wider than the image clipping area in a direction in which said images are continuously recorded;

representing an image obtained by processing said extended image data in accordance with said image processing condition and the image clipping area or only an image within the image clipping area obtained by processing said extended image data in accordance with said image processing condition;

judging whether the represented image clipping area is appropriate or not; and modifying the image clipping area in accordance with a result of said judging.

2. The image processing method according to claim 1, wherein, in addition to the image processing condition set as a first image processing condition using said extended image data, a second image processing condition is set using the image data of the image clipping area and wherein said extended image data is processed using the first image processing condition and the second image processing condition.

3. The image processing method according to claim 2, wherein said first image processing condition corresponds to processing of a local area of the image, and wherein said second image processing condition corresponds to processing of a whole area of the image.

4. The image processing method according to claim 3, wherein processing of said local area of said image is processing using an area mask, and wherein processing of said whole area of said image is processing of at least one of density and color balance.

5. The image processing method according to claim 1, wherein a ratio of said extended image data to said image clipping area is allowed to be changeable from one image to another image such that when a clipping accuracy of said image clipping area becomes lower, said ratio becomes larger.

6. The image processing method according to claim 1, wherein the image processing conditions are set for density and color correction.

7. The image processing method according to claim 1, wherein the image processing condition is set by constructing a density histogram from the image data of the image clipping area or the extended image area, and by computing based on the constructed density histogram at least one image characteristic quantity selected from the group consisting of average density, highest density, and lowest density.

8. A method of setting an image processing condition, the method comprising:

detecting a frame area of plurality of image data continuously recorded on a photographic film, the frame area having a first width in a transport direction in which the image data is continuously recorded;

setting an extended area which has a second width relatively wider than the first width in the transport direction in which the image data is continuously recorded;

setting a first image processing condition based on image data in the extended area; and setting a second image processing condition based on image data in the frame area, wherein the first image processing condition is applied to the extended area of the image, and the second image processing condition is applied to the extended area and frame area.

9. The method of setting an image processing condition of claim 8, wherein detecting a frame area includes comparing a pre-scanned film length of image data of an image frame to a reference frame size, when the reference frame matches the film length of the image data, the frame area is set as the reference frame, and when no reference frame matches the length of the image data, the frame area is set as the length of image data.

10. The image processing method of claim 8, wherein the first image processing condition corresponds to an object within the image including a person's face or a sky.

11. An image processing method of setting an image processing condition of an image using image data of the image obtained by photoelectrically reading an original recorded continuously with a plurality of images, comprising the steps of:

setting the image processing condition of the image using image data of an image clipping area corresponding to the image and extended image data which is image data of an extended image area that is wider than the image clipping area in a direction in which said images are continuously recorded;

representing an image obtained by processing said extended image data in accordance with said image processing condition and the image clipping area or only an image within the image clipping area obtained by processing said extended image data in accordance with said image processing condition;

judging whether the represented image clipping area is appropriate or not; and modifying the image clipping area in accordance with a result of said judging.

12. An image processing method of setting an image processing condition of an image using image data of the image obtained by photoelectrically reading an original recorded continuously with a plurality of images, comprising the steps of:

setting the image processing condition of the image using extended image data which is image data of an extended image area that is wider than an image clipping area corresponding to the image in a direction in which said images are continuously recorded;

representing an image obtained by processing said extended image data in accordance with said image processing condition and the image clipping area or only an image within the image clipping area obtained by processing said extended image data in accordance with said image processing condition;

judging whether the represented image clipping area is appropriate or not; and modifying the image clipping area in accordance with a result of said judging.

13. An image processing method of setting an image processing condition of an image using image data of the image obtained by photoelectrically reading an original recorded continuously with a plurality of images, comprising the steps of:

setting the image processing condition of the image using either image data of an image clipping area corresponding to the image or extended image data which is image data of an extended image area that is wider than the image clipping area in a direction in which said images are continuously recorded;

representing an image obtained by processing said extended image data in accordance with said image processing condition and the image clipping area or only an image within the image clipping area obtained by processing said extended image data in accordance with said image processing condition.

* * * * *